No. 670,242. Patented Mar. 19, 1901.
J. S. NEGUS.
AZIMUTH INSTRUMENT.
(Application filed Nov. 28, 1900.)
(No Model.) 3 Sheets—Sheet 1.
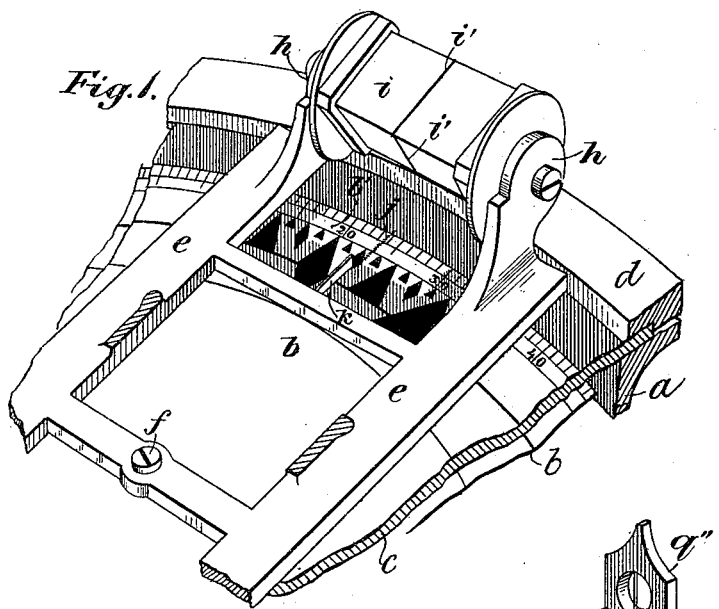
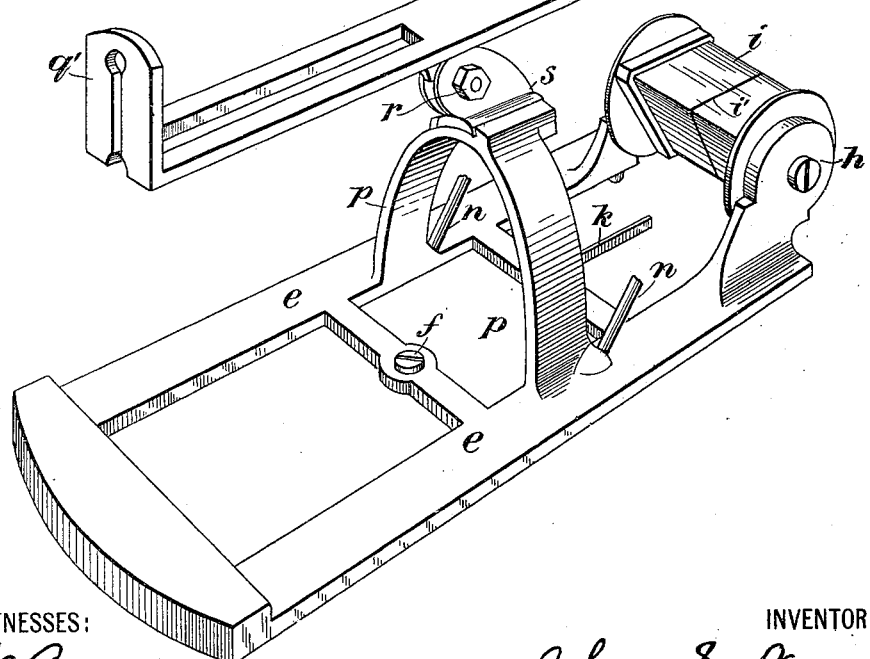
WITNESSES:
L. N. Legendre
Peter N. Ross
INVENTOR
John S. Negus
BY
Henry Bennett
ATTORNEY
THE NORRIS PETERS CO., PHOTO-LITHO., WASHINGTON, D. C.

No. 670,242. Patented Mar. 19, 1901.
J. S. NEGUS.
AZIMUTH INSTRUMENT.
(Application filed Nov. 28, 1900.)
(No Model.) 3 Sheets—Sheet 2.
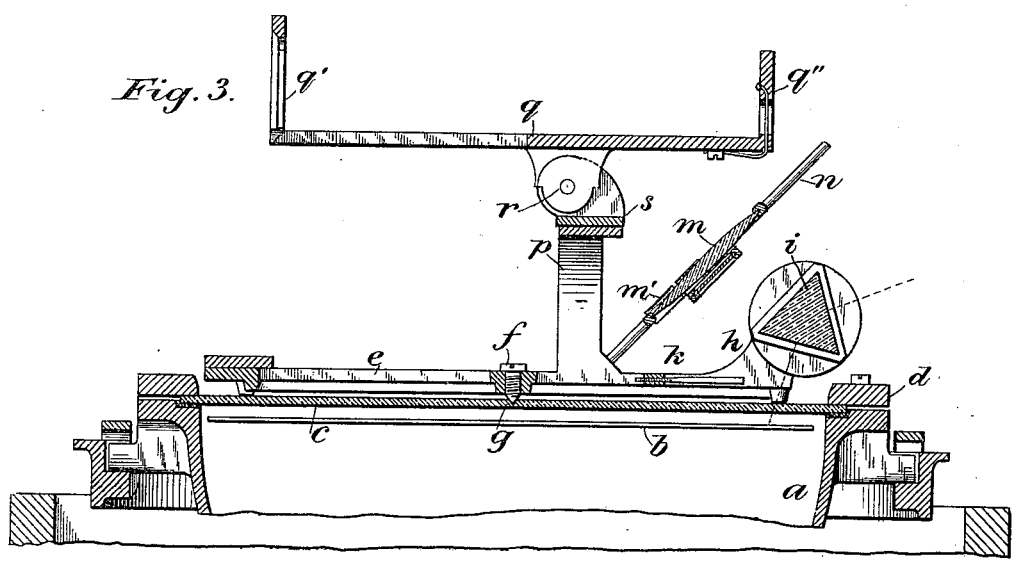
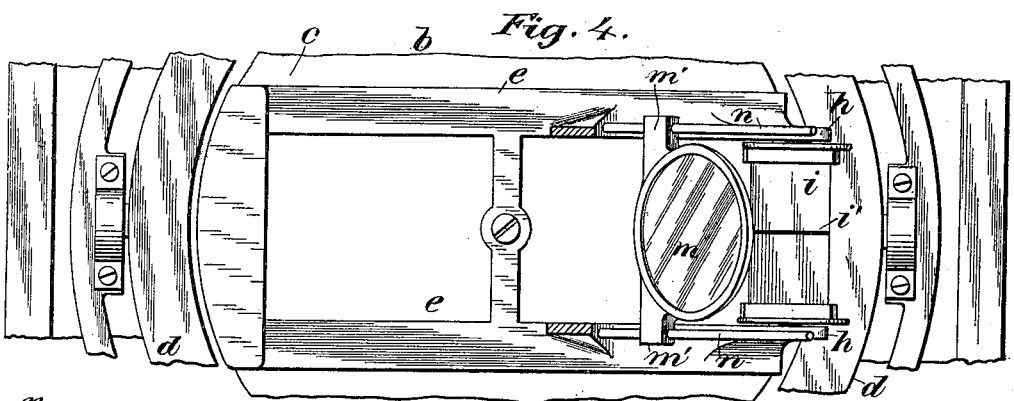
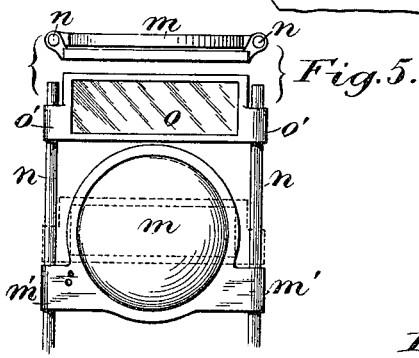
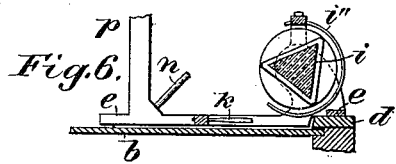
WITNESSES:
L. N. Legendre
Peter H. Ross
INVENTOR
John S. Negus
BY
Henry Connett
ATTORNEY No. 670,242. Patented Mar. 19, 1901.
J. S. NEGUS.
AZIMUTH INSTRUMENT.
(Application filed Nov. 28, 1900.)
(No Model.) 3 Sheets—Sheet 3.

WITNESSES:
L. N. Legendre
Peter A. Ross

INVENTOR
John S. Negus
BY
Henry Gannett
ATTORNEY

UNITED STATES PATENT OFFICE.

JOHN S. NEGUS, OF BROOKLYN, NEW YORK.

AZIMUTH INSTRUMENT.

SPECIFICATION forming part of Letters Patent No. 670,242, dated March 19, 1901.

Application filed November 28, 1900. Serial No. 38,011. (No model.)

*To all whom it may concern:*

Be it known that I, JOHN S. NEGUS, a citizen of the United States, residing in the borough of Brooklyn, in the county of Kings and city and State of New York, have invented certain new and useful Improvements in Azimuth Instruments, of which the following is a full, clear, and exact specification.

This invention relates to the class of azimuth instruments such as are commonly used in connection with the compass on shipboard for correcting compass-courses and taking bearings.

The object of the invention is, in the main, to provide a simple and easily-operated instrument which will not be materially affected by the movements of the vessel or by the compass being out of level and from which an accurate reading may be obtained even under adverse conditions. It may be stated here, briefly, that with the ordinary azimuth instruments a line or spot of light is thrown on the graduations of the compass-card at the bearing-point, the field adjacent being in the shadow, and this has the effect of rendering the reading obscure or difficult, while in the operation of the present instrument a considerable field on the graduated margin of the compass-card at and about the bearing is illuminated and the bearing is indicated by a shadow on said illuminated field, said shadow being preferably radial to the compass-card. This enables the bearing to be read with ease and accuracy.

Figure 8:
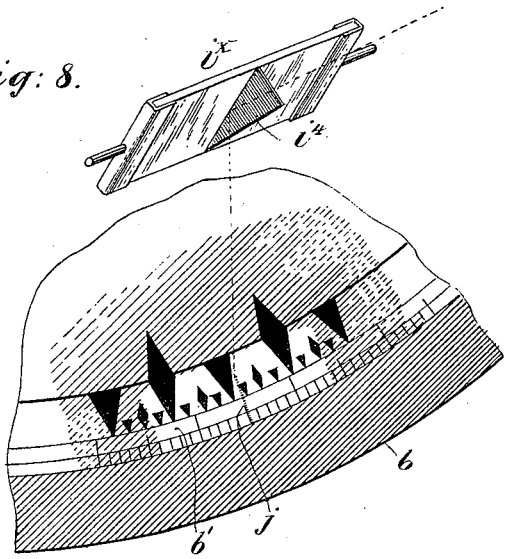
Figure 9:
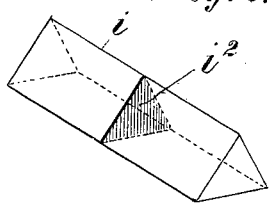
Figure 10:
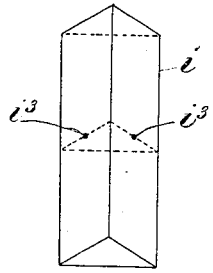
Figure 11:
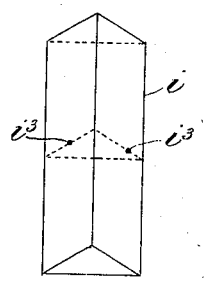

In the accompanying drawings, which illustrate an embodiment of the invention, Figure 1 is an illustrative perspective view showing the manner of using the instrument. Fig. 2 is a perspective view of the instrument with the range-sights mounted thereon. Fig. 3 is a vertical longitudinal section of the instrument, showing the magnifying-lens in place and a part of the ship's compass. Fig. 4 is a plan of the instrument, the range-sights and support being broken away. Fig. 5 is a detached view illustrating the mounting of the magnifying-lens and the tinted glass slide. Figs. 6 and 7 are views illustrating a modified construction of the instrument, which will be hereinafter described. Fig. 8 is a perspective view illustrating a modification of the instrument wherein a reflecting-surface is employed in lieu of a prism for deflecting the rays of light; and Figs. 9, 10, and 11 show different ways of marking the prism to produce the shadow.

Referring to the principal figures of the drawings, $a$ represents the bowl of an ordinary mariner's compass; $b$, the card of same; $c$, the glass cover-plate, and $d$ the clamping-ring. These are or may be of the usual construction.

As shown in the principal views, the azimuth instrument is adapted to be pivotally mounted on the glass plate $c$. The frame $e$ of the instrument may be of any simple and convenient form. It has a conical screw-pivot $f$, the point of which finds a bearing in a socket $g$ in the glass directly over the center of the compass-card, and said frame is provided at its front end with bearing-lugs $h$, in which is rotatively mounted a transparent prism $i$, here shown as triangular. The axis of this prism is horizontal, and it may be turned axially and so adjusted as to receive and refract the sun's rays and direct them down on the compass-card, thus illuminating a rectangular space on the same at the margin where the degree graduations and numerals are situated, as clearly shown in Fig. 1.

About the middle of the prism $i$ and extending transversely across its respective faces are marked lines $i'$, which are substantially opaque and may be formed by cutting slight grooves in the glass of the prism and filling them with some opaque cement, enamel, or the like. Preferably these lines are on all three of the faces of the prism and form a continuous band or light-intercepting line; but it would suffice if the lines were on two faces only of the prism.

Before proceeding further with the description the manner of using the instrument may now be explained with special reference to Figs. 1 and 3. The instrument being placed on the compass, as before explained, and turned until the front end bearing the prism is directed toward the sun the prism is rotated until the refracted rays of the sun are directed down upon the graduated margin of the compass-card, as seen at $b'$ in Fig. 1. The opaque lines $i'$ on the faces of the prism $i$ cast shadows on the illuminated surface $b'$, and when the instrument is not properly alined with the sun the two light-intercepting lines on adjacent faces of the prism cast a shadow having a V form, due to the divergence of the two line-shadows; but when the instrument is brought into accurate alinement the two line-shadows are brought into coincidence, as seen at $j$ in Fig. 1, and where said line intersects the graduated margin of the card will be found the true reading in degrees on the compass-card. The shadow cast on the illuminated field at the true reading is denominated a "significant" shadow, as it signifies to the observer by its form or character that it marks the true reading. At either side of the graduation-mark at the true reading while the instrument is being adjusted or moved there will be a shadow in the illuminated filled, but this shadow will not be of the same form as the characteristic or significant shadow, seen only when the instrument is properly set at the true reading.

To aid in the alinement of the instrument, it may have a thin axially-alined finger $k$; but such a finger or pointer is not absolutely essential where there are light-intercepting lines $i'$ on two faces of the prism; but where only one such line is used this finger is necessary for alinement with the shadow. The center of the pivot $f$, the finger $k$, and the light-intercepting lines $i'$ on the prism are all alined, and when the shadow $j$ is at the proper point on the graduated margin of the card it will appear to the eye of the operator as connecting the lines on the prism with the finger $k$.

To aid the eye in reading the instrument, a removable magnifying-lens $m$ may be employed, as seen in Figs. 3 and 4. This lens has apertured lugs $m'$ on its frame, which slide on guide-pins $n$ on the frame $e$ of the instrument.

In case the sun is shining very brightly the lens $m$ may be smoked or a slide of tinted glass or other transparent medium may be used. Such a slide $o$ is seen in Fig. 5 and is provided with apertured lugs $o'$ to slide on the pins $n$. The lens $m$ and slide $o$ may be used together or separately.

It is sometimes desirable to get from a ship the bearings of objects on land, and to provide for this the instrument has or may have on the frame $e$ a supplementary frame $p$ to support a range-sight $q$. This sight comprises a bar having at its ends uprights $q'$ and $q''$, one of which has an upright slit and the other an upright wire. This sight $q$ is pivotally mounted at $r$ in a block or piece $s$, which is fitted removably in a keeper in the top of the frame $p$, and the slit and wire of the range-sight are in alinement with the azimuth instrument.

In the construction of the instrument above described it is adapted to be pivotally mounted in the central socket $g$ in the glass $c$; but where the clamping-ring $d$ of the compass is true and concentric with the center or axis of the compass-card the construction illustrated in Figs. 6 and 7 may be employed. In this construction the frame of the instrument fits up to the inner margin of the rim or ring $d$ and is guided thereby, its axis being thus always maintained in a radial position with respect to the same. This construction of Figs. 6 and 7 also illustrates another form of light-intercepter at the prism $i$. In the principal views this intercepter consists of opaque lines $i'$ across the faces of the prism; but in Figs. 6 and 7 this intercepter is not on the prism but comprises a curved wire or narrow strip $i''$, of opaque material, fixed at some point on the frame $e$ and embracing the prism, but not in contact therewith. This form of intercepter will cast a line-shadow on the margin of the card; but the lines directly on the prism are preferred.

It will be noted that by the construction of the instrument described certain important advantages are gained. The prism or device for deflecting the rays of light upon the compass-card is brought down into relatively close proximity to the said card, whereby the aberration or error due to the compass not being level or to the movements of the vessel is reduced to a minimum. The illumination of a field on the graduated margin of the compass-card on which field is thrown a significant shadow at the true reading greatly facilitates the adjustment of the instrument in taking or correcting a bearing, and, as has been stated, it also enables the operator to note more readily and accurately the correct reading than can be done with instruments which reverse this operation and throw a line or point of light on a dark field or field in shadow.

It may be explained that the positions of the faces of the prism $i$ will vary with the altitude of the sun when the observation is taken, and in the several views this has not been considered. Fig. 3, however, shows about the normal position of the prism. The latter being rotative about its axis may be set as desired.

In explanation of the part or device herein called a "light-intercepter" it may be said that this device may have many forms. The only requisite is that it shall be sufficiently opaque to cast a shadow and that it shall have when no finger $k$ is used two parts or points separated from each other, but both within a vertical longitudinal plane coincident with the axis of the instrument. In the principal views the two parts or points of the intercepter are lines on the divergent faces of the prism; but in Fig. 9 it is a plane triangle $i^2$ of opaque material between the ends of two alined prisms. Such an intercepter would cast a triangular shadow at all times except at the correct reading. In Fig. 10 the intercepter consists of two opaque dots or spots $i^3$, which will cast separate shadows except at the correct reading, when one will coincide with the other and form a single shadow. In Fig. 11 the intercepter consists also of two dots or spots which come into radial alinement on the compass-card at the correct reading. These are only a few of many forms of intercepters on prisms that would suggest themselves to any one skilled in the art.

In Fig. 8 is illustrated a mirror $i^x$ for deflecting the rays of light down upon the compass-card in lieu of a prism. In this construction the mirror is pivotally mounted at its ends, as in the case of a prism, and the light-intercepter $i^4$ is in the form of a vane of thin opaque material projecting edgewise from the face of the mirror. This vane will cast a triangular shadow except at the true reading, when the shadow will have the form of a line.

It will be seen from the above that the invention comprises as its essentials a means for illuminating a field on the compass-card by deflecting the light-rays thereupon either by refraction or reflection and means for casting a significant point or line of shadow on said illuminated field at the true reading. This latter means comprises, broadly speaking, two opaque parts or points, both in a vertical plane coincident with the axis of the instrument and casting shadows which are superposed or alined only at the true azimuth reading on the compass-card, or where the finger $k$ in said vertical plane is employed a single opaque part or light-intercepter will serve. In the first case the two shadows become alined or superposed at the true reading, while in the latter case the finger and the shadow become alined, as has been explained.

Having thus described my invention, I claim—

1. In an azimuth instrument for use with a compass, the combination with means for receiving the sun's rays and deflecting them down upon the compass-card and thus illuminating a broad field thereon, of means in the path of said downwardly-deflected rays which throws a significant shadow on said card within said illuminated field at the point of correct reading of the instrument.

2. In an azimuth instrument for use on a compass, the combination with a frame to rest on the compass, of a prism mounted on said frame with its longitudinal axis horizontal and at right angles to the horizontal axis of said frame, said prism being arranged so as to receive and deflect the sun's rays down upon the compass-card and having on it a light-intercepter which lies wholly within a vertical plane coincident with the axis of the instrument, and in the path of rays from the sun received by the prism and deflected down upon the compass-card, whereby said intercepter casts a shadow on the illuminated field thus thrown on the compass-card, and a finger or pointer $k$ on the frame and also in said plane, said finger being alined with said shadow at the true reading.

3. In an azimuth instrument for use with a compass, the combination with means for receiving the sun's rays and deflecting them down upon the compass-card below and illuminating a field thereon, of a light-intercepter situated in the path of said deflected rays and having two parts, both in a vertical plane coincident with the axis of the instrument, said two-part light-intercepter casting a shadow on said illuminated field which is significant at the true reading only on said card.

In witness whereof I have hereunto signed my name, this 26th day of November, 1900, in the presence of two subscribing witnesses.

JOHN S. NEGUS.

Witnesses:
HENRY CONNETT,
PETER A. ROSS.